US009539915B2

(12) United States Patent
Fuks et al.

(10) Patent No.: US 9,539,915 B2
(45) Date of Patent: Jan. 10, 2017

(54) AUTOMOTIVE VEHICLE WITH OCCUPANT DETECTION SYSTEM

(75) Inventors: Stephen Fuks, Ann Arbor, MI (US); Ingrid Scheckenbach, Ferschweiler (DE); Claus-Christian Kedenburg, Konz (DE); Christoph Wendt, Trier (DE)

(73) Assignee: IEE International Electronics & Engineering S.A., Echternach (LU)

( * ) Notice: Subject to any disclaimer, the term of this patent is extended or adjusted under 35 U.S.C. 154(b) by 803 days.

(21) Appl. No.: 12/595,140

(22) PCT Filed: Apr. 10, 2008

(86) PCT No.: PCT/EP2008/054323
§ 371 (c)(1),
(2), (4) Date: Jul. 14, 2010

(87) PCT Pub. No.: WO2008/122658
PCT Pub. Date: Oct. 16, 2008

(65) Prior Publication Data
US 2010/0295695 A1  Nov. 25, 2010

(30) Foreign Application Priority Data

Apr. 10, 2007 (EP) .................................... 07105875

(51) Int. Cl.
*G08B 21/00* (2006.01)
*B60N 2/00* (2006.01)
*B60R 21/015* (2006.01)

(52) U.S. Cl.
CPC ......... *B60N 2/002* (2013.01); *B60R 21/01532* (2014.10)

(58) Field of Classification Search
CPC .................... B60R 2021/01529; B60R 21/015
(Continued)

(56) References Cited

U.S. PATENT DOCUMENTS 6,079,738 A * 6/2000 Lotito et al. ................... 280/735
6,693,440 B2 * 2/2004 Basir et al. ..................... 324/662
(Continued)

FOREIGN PATENT DOCUMENTS

EP  0145391 A2  6/1985
WO  03049970 A1  6/2003

OTHER PUBLICATIONS

International Search Report PCT/EP2008/054323; Dated Jun. 25, 2008.

*Primary Examiner* — Mark Rushing
(74) *Attorney, Agent, or Firm* — Reising Ethington P.C.

(57) ABSTRACT

An automotive vehicle has arranged therein a vehicle seat and is equipped with an occupant detection system for detecting whether an occupant is present on the vehicle seat, the system including a first antenna electrode arranged in the seat and a sensing circuit associated with the seat where the sensing circuit includes an oscillation circuit connected to the first antenna electrode for applying to the first antenna electrode a first oscillating signal and a current detection circuit also connected to the first antenna electrode for determining a first current flowing in the first antenna electrode in response to the first oscillating signal being applied, the first current indicating whether an occupant is present on the vehicle seat, where the vehicle is further equipped with an appliance including an appliance control device arranged in the vehicle compartment at a location where it can be operated by an occupant of the seat and the occupant detection system is configured for detecting whether the occupant attempts to interact with the appliance control device, in particular, the occupant detection system includes a second antenna electrode arranged together with the appliance control device, and an oscillator is operatively connected to the second antenna electrode for applying a second oscillating signal to the second antenna electrode and
(Continued)

the current detection circuit is configured for determining a second current flowing in the first antenna electrode in response to the second oscillating signal being applied to the second antenna electrode where the second current thus indicates whether an occupant of the vehicle seat has a part of their body proximate to the appliance control device.

11 Claims, 3 Drawing Sheets

(58) Field of Classification Search
USPC ... 340/552, 561, 562, 667; 701/45; 280/735; 180/273
See application file for complete search history.

(56) References Cited

U.S. PATENT DOCUMENTS

| | | |
|---|---|---|
| 2004/0056758 A1 | 3/2004 | Schwartz |
| 2005/0038586 A1 | 2/2005 | Griffin et al. |
| 2007/0029768 A1* | 2/2007 | Clos et al. ............ 280/735 |
| 2008/0186282 A1* | 8/2008 | Nix et al. ............ 345/173 |

* cited by examiner

AUTOMOTIVE VEHICLE WITH OCCUPANT DETECTION SYSTEM

TECHNICAL FIELD OF THE INVENTION

The present invention generally relates to automotive occupancy sensor systems for determining the presence of an object or a passenger in a seat, in order to provide an occupancy state signal or condition signal, e.g. for use with a safety restraint system control. The present invention more particularly relates to a capacitive seat occupancy detection system.

BRIEF DESCRIPTION OF RELATED ART

Capacitive occupant detection systems are conventionally used in automotive vehicles to provide an occupant protection system with information concerning the occupancy state of one or more vehicle seats. Such information may include a simple indication whether a seat occupant is present or not. More sophisticated systems additionally provide an indication of occupant class. Based upon information provided by the occupant detection system, the occupant protection system can take appropriate measures in case of a collision. A capacitive occupant detection system is described, for instance, in European patent application EP 1 457 391 A1. The system comprises a capacitive seat electrode and a capacitive foot-area electrode arranged in a compartment of the vehicle. During operation, capacitive coupling between the seat electrode and an object placed on the seat is determined, as well as capacitive coupling between the foot-area electrode and the seat electrode. The seat electrode comprises a shielding electrode (guard electrode), directed towards the seat frame, and a sensing electrode, directed towards the occupant of the seat. An insulating layer is arranged between the sensing electrode and the shielding electrode. In operation, the shielding electrode and the sensing electrode are driven by the same signal, so that the guard electrode prevents the electric field from the sensing electrode to couple with the seat frame. Thus the sensing electrode is active only in the direction of a seat occupant and not towards an object placed below the seat.

It has been suggested to use capacitive occupant detection systems to enhance the operability of appliances in a car compartment. US 2005/0038586 A1 discloses a system including a plurality of transmitters arranged in the seats of a vehicle and a receiver integrated into the control device of an electrical appliance (such as the HVAC device or an infotainment system). Powered from a common microcontroller, each transmitter develops and radiates a place-specific radio frequency signal. The receiver integrated into the control device is designed such that the signals transmitted from the transmitters are only weakly received unless the respective occupant places his or her hand near the control device in an attempt to adjust the settings thereof. The output of the receiver is coupled to the microcontroller, which identifies the received signal to determine which of the occupants is attempting to interact with the control device. Depending on who is attempting to interact with the control device, its functionality may be adjusted to the detected occupant. If the received signal is that of the driver, for instance, minimum distraction functionality may be enabled; on the other hand, if the received signal is that of the front passenger transmitter, expanded capability, communication and customization control functions may be enabled.

BRIEF SUMMARY OF THE INVENTION

The invention provides an improved capacitive occupant detection system enhancing the operability of an appliance in automotive environment.

An automotive vehicle has arranged therein a vehicle seat and is equipped with an occupant detection system for detecting whether an occupant is present on the vehicle seat. The occupant detection system includes a first antenna electrode arranged in the seat and a sensing circuit associated with the seat. The sensing circuit comprises an oscillation circuit connected to the first antenna electrode for applying to the first antenna electrode a first oscillating signal and a current detection circuit also connected to the first antenna electrode for determining a first current flowing in the first antenna electrode in response to the first oscillating signal being applied. The first current indicates whether an occupant is present on the vehicle seat. The vehicle is further equipped with an appliance including an appliance control device (such as e.g. a button, a knob, a touchscreen, a joystick, a slider, a control panel, etc.) arranged in the vehicle compartment at a location where it can be operated by an occupant of the seat. According to an important aspect of the invention, the occupant detection system is configured for detecting whether the occupant attempts to interact with the appliance control device. In particular, the occupant detection system includes a second antenna electrode arranged together with (e.g. in, on or adjacent to) the appliance control device. An oscillator is operatively connected to the second antenna electrode for applying a second oscillating signal to the second antenna electrode and the current detection circuit is configured for determining a second current flowing in the first antenna electrode in response to the second oscillating signal being applied to the second antenna electrode. The second current thus indicates whether an occupant of the vehicle seat has a part of their body proximate to the appliance control device. As will be appreciated, the system may use the same electronics in the seat as the system disclosed in EP 1 457 391 A1.

According to a first preferred embodiment of the invention, the occupant detection system is configured for operating in a first mode of operation and in a second mode of operation, the first mode of operation being associated with detecting whether an occupant is present on the vehicle seat, the second mode of operation being associated with detecting whether the occupant attempts to interact with the appliance control device. Most preferably, as long as no occupant is detected on the vehicle seat, the occupant detection system operates in the first mode of operation only; if, however, an occupant is detected on the vehicle seat, the occupant detection system alternately operates in the first and second modes of operation.

According to a second preferred embodiment of the invention, the occupant detection system is configured for simultaneously detecting whether an occupant is present on the vehicle seat and whether the occupant attempts to interact with the appliance control device. Most preferably, the oscillator circuit comprises, in this case, an oscillator connected with the first antenna electrode for applying the first oscillating signal thereto, the first oscillating signal and the second oscillating signal being of different frequencies. Moreover, the current detection circuit comprises, in this case, a first frequency-selective current meter sensitive at the frequency of the first signal and a second frequency-selective current meter sensitive at the frequency of the second signal.

Those skilled will appreciate that the oscillator operatively connected to the second antenna electrode may be part of the oscillation circuit. In case of the first preferred embodiment, the oscillation circuit may comprise a single oscillator and a switch, which alternatively connects the first or the second antenna electrode to the oscillator, in accordance with the current mode of operation of the occupant detection system. The oscillation circuit may, alternatively, comprise a first oscillator connected to the first antenna electrode and a second oscillator connected to the second antenna electrode. It should be noted that the terms "operatively connected", as used herein, shall be understood to encompass "connected via a switch", wherein the switch does not necessarily provide for electrical connection all the time.

As will further be appreciated, the oscillator connected to the second antenna electrode may be arranged with (i.e. in the direct neighbourhood of) the appliance control device.

BRIEF DESCRIPTION OF THE DRAWINGS

Further details and advantages of the present invention will be apparent from the following detailed description of several not limiting embodiments with reference to the attached drawings, wherein.

DETAILED DESCRIPTION OF THE INVENTION

Figure 1:
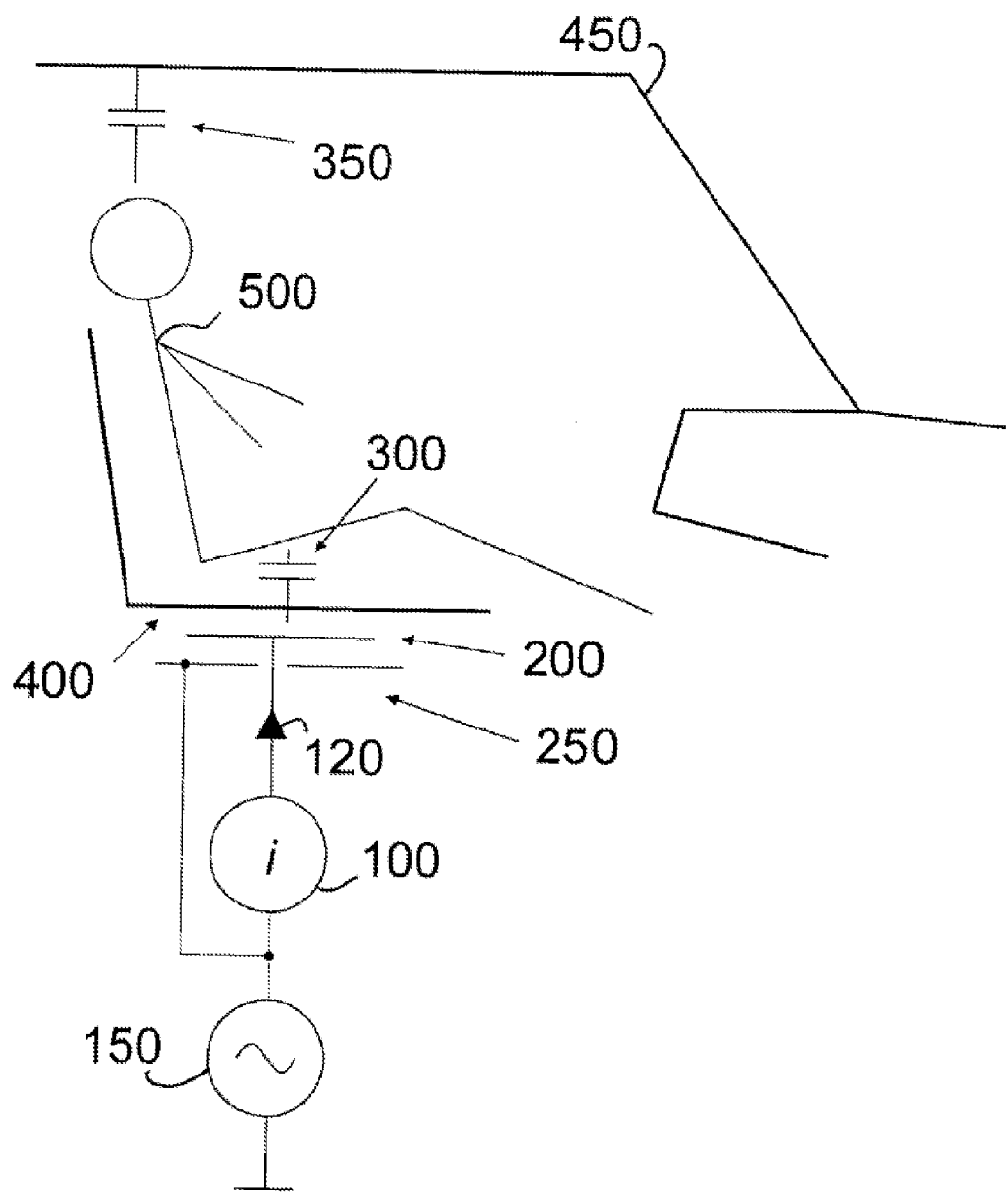
FIG. 1 is a schematic view of a conventional capacitive occupant detection system.

The conventional occupant detection system of FIG. 1 comprises an antenna electrode (sensing electrode) 200 and a shielding electrode (guard electrode) 250 disposed in the seating surface of a vehicle seat 400 and connected to a sensing circuit. The sensing circuit keeps the shielding electrode 250 at substantially the same potential as the sensing electrode 200. Accordingly, the electric field created by the antenna electrode is directed towards the space normally occupied by an occupant 500 of the vehicle seat. The occupant detection system determines the capacitance 300, 350 between the antenna electrode 200 and the car chassis 450. This capacitance depends upon a person or object on the seat. As a general rule, a large and heavy occupant 500 results in a higher measured capacitance.

To determine the capacitance, the sensing circuit comprises an oscillator 150 and a current detection circuit arranged in the vehicle seat 400. The oscillator 150 applies a sine wave voltage having a certain frequency and amplitude to the antenna electrode 200. The current (indicated in the drawing as arrow 120) flowing into the antenna electrode 200 is measured with a frequency-selective current meter 100. The measured current 120 is proportional to the capacitance; accordingly, the capacitance is determined by the measured current 120. For making the decision of whether an occupant is present, the measured current may be compared to a predefined threshold.

Figure 2:
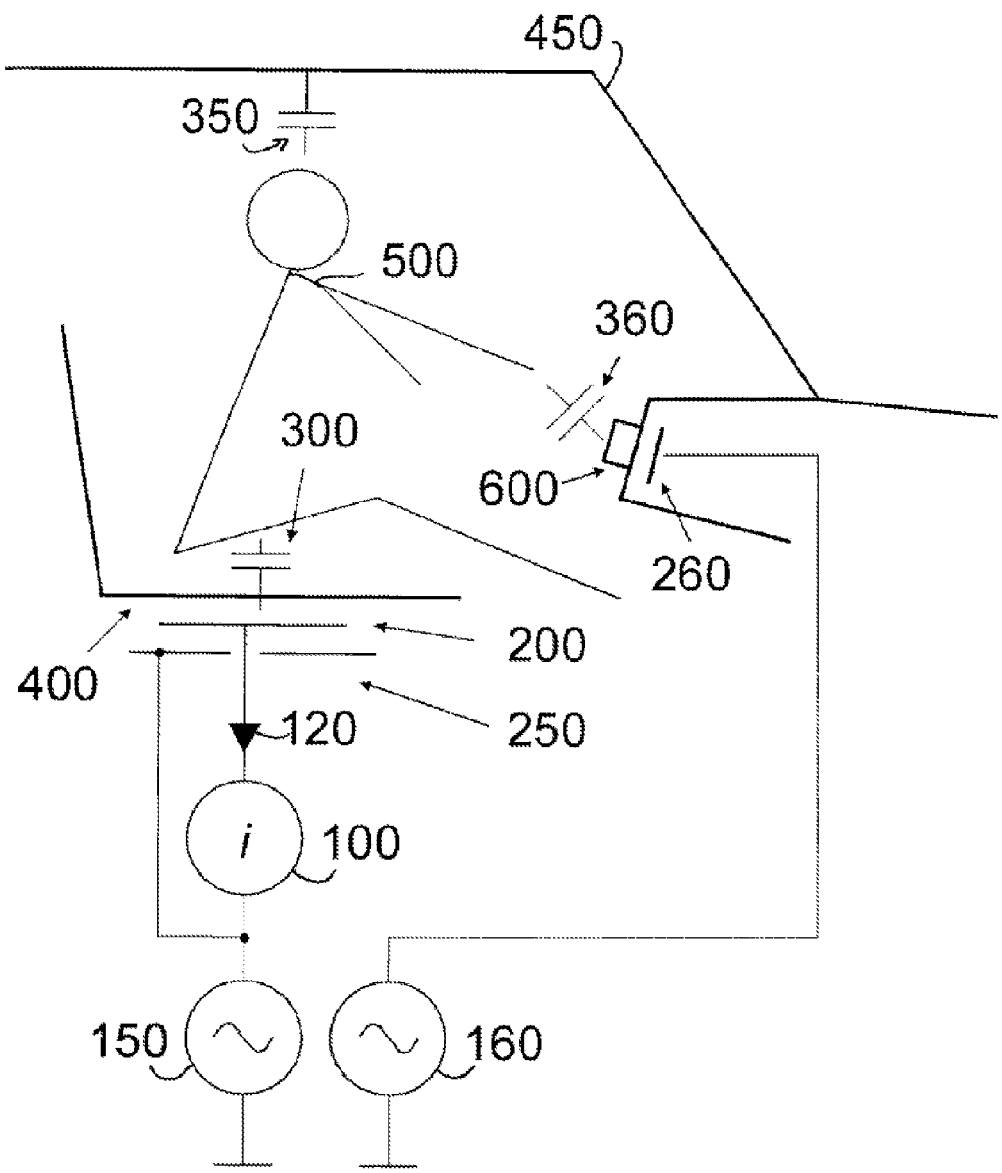
FIG. 2 is a schematic view of a first preferred embodiment of the invention.
Figure 3:
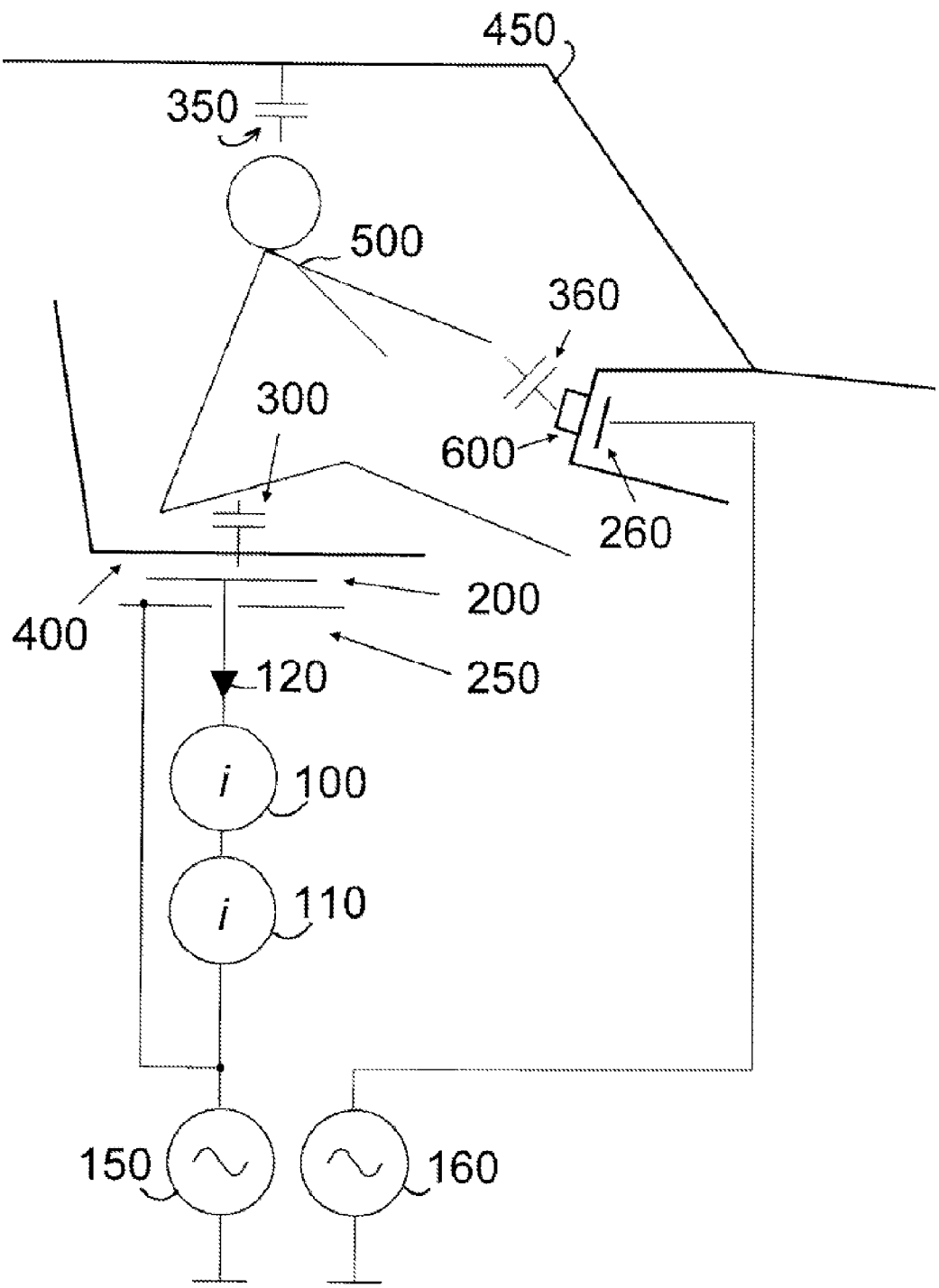
FIG. 3 is a schematic view of a second preferred embodiment of the invention.

FIGS. 2 and 3 show an occupant detection system according to a first and a second preferred embodiment of the invention, respectively. The occupant detection systems of FIGS. 2 and 3 have the functionalities of the system of FIG. 1 and are additionally configured for determining whether the occupant 500 of the seat 400 is operating or attempting to operate the control device 600 of a an electrical appliance (such as e.g. a car radio, a navigation system, an HVAC etc.) arranged, for instance in the centre console of the vehicle. If the control device 600 is operated but the occupant detection system does not detect the occupant 500 of seat 400 as doing so, it can be determined that the operating person is someone else. Accordingly, if the occupant detection system has its sensing circuit arranged in the front passenger seat, it can determine whether the passenger on the front passenger seat or the driver operates the control device 600. This allows, for instance, blocking certain functionalities for safety reasons if the person who attempts to operate the control device is not authorised. (The non-authorised person could be the passenger or the driver, depending on the functionality.) More generally, any kind of user-dependent behaviour (e.g. for increasing comfort) could be of the appliance or its control device could be governed by the occupant detection system of the present invention. To make the decision whether the occupant is attempting to interact with the control device 600, the current measured in the first antenna electrode 200 in response to the signal being applied to the second antenna electrode 260 may be compared with a predetermined threshold. The capacitive occupant detection system could comprise sensing circuits not only in the passenger seat but also in other seats e.g. the driver seat. In contrast to a system having a sensing circuit in the passenger seat only, such system would enable positive detection of whether the driver interacts with the control device.

The occupant detection system of FIG. 2 includes a conventional system as shown in FIG. 1. The system of FIG. 2 further includes a second antenna electrode 260 and a second oscillator 160 connected to the second antenna electrode 260. The second oscillator 160 is shown adjacent the first oscillator 150 and connected to the second antenna electrode 260 by a relatively long wire. Alternatively the second oscillator 160 could also be arranged proximate to the second antenna electrode 260. The latter is arranged together with (e.g. immediately adjacent to) the control device 600 of the concerned appliance. It should be noted that a conductive part (e.g. a metal plate or a metal frame part) of the control device 600 could form the second transmitting electrode 260.

The capacitive occupant detection system of FIG. 2 operates in two different modes of operation: the first mode of operation is associated to detection and/or classifying the occupancy state of the vehicle seat 400; the second mode of operation is associated to detection whether the occupant 500 of the seat 400 attempts to interact with control device 600.

In the first mode of operation, the system works like the conventional occupant detection system of FIG. 1. In this mode, the oscillator 160 is switched off or temporarily bypassed by means of a switch.

In the second mode of operation, a sine wave voltage having a certain frequency and amplitude is applied to the second antenna electrode 260, in response to which the latter generates a weak electric field in the surroundings of the appliance control device 600. In the second mode, the first oscillator 150 is switched off or temporarily electrically bypassed by means of a switch. If the occupant 500 of the passenger seat 400 approaches their hand to the control device 600, the capacitance 360 between the second antenna electrode 260 and the occupant 500 increases. Accordingly, the capacitive coupling between the second antenna electrode 260 and the first antenna electrode 200 in the vehicle seat increases. The increase of capacitive coupling can be detected in the first antenna electrode 200 as an increase of current flowing therein. This current 120 is measured with the frequency selective current meter 100.

With respect to this embodiment, it should be noted that the frequency of the signal applied to the second antenna electrode 260 in the second mode of operation could be the same as the frequency of the signal applied to the first antenna electrode 200 in the first mode of operation. This would be the case, for instance, if a single oscillator were connected in alternance to the first or the second antenna electrode by means of a switch. Alternatively, different frequencies could be used in the two modes of operation.

It should furthermore be noted that the system of FIG. 2 is advantageously configured so as to operate in the first mode of operation as long as no occupant is detected and switch to the second mode of operation only if an occupant has been detected.

The occupant detection system of FIG. 3 comprises the same elements as the system as shown in FIG. 2 and an additional frequency-selective current meter 110. There are, however, differences in operation. In particular, the first oscillator 150 and the second oscillator 160 operate at different frequencies. The signal applied to the first antenna electrode 200 thus has a first frequency different from the second frequency of the signal applied to the second antenna electrode 260. In the embodiment of FIG. 3, the current caused to flow into the first antenna electrode includes two components: a first current flowing in response to the signal applied to the first antenna electrode 200 and a second current caused to flow in the first antenna electrode 200 in response to the signal applied to the second antenna electrode 260. Both current components can be measured simultaneously. Indeed, the first frequency-selective current meter 100 is configured to measure only currents within a narrow frequency band around the first frequency and the second current meter 110 is configured to measure only currents within a narrow frequency band around the second frequency. The frequency bands are chosen such that they do not overlap with the respective other frequency (e.g. by appropriate selection of band pass filters). The current measured with the first current meter 100 is used to determine the occupancy state of the seat, whereas current measured with the second current meter 110 is used to decide whether the occupant of seat 400 is approaching the control device 600. Those skilled will appreciate that the first and second currents could also be measured sequentially.

With regard to the embodiment described with reference to FIG. 3, it should be noted that this system might also operate in more than one modes of operation. For instance, a first mode of operation could be associated to occupant detection only, whereas a second mode of operation could be simultaneously associated to occupant detection and detection of whether an occupant 500 attempts to interact with the control device 600. In such first mode of operation, the oscillator 160 would be switched off or temporarily electrically bypassed by means of a switch. In the second mode of operation, the system would operate as described hereinbefore.

The invention claimed is:

1. An automotive vehicle comprising
a vehicle seat,
an occupant detection system to detect whether an occupant is present on said vehicle seat, said occupant detection system including a first antenna electrode arranged in said seat and a sensing circuit associated with said seat, said sensing circuit comprising an oscillation circuit operatively connected to said first antenna electrode for applying to said first antenna electrode a first oscillating signal and a current detection circuit connected to said first antenna electrode for determining a first current flowing in said first antenna electrode in response to said first oscillating signal being applied, said first current being indicative of whether an occupant is present on said vehicle seat; and
an appliance including an appliance control device;
wherein said occupant detection system includes a second antenna electrode proximate to an upper body of an occupant configured for being within reach of an occupant, said second antenna electrode being arranged immediately adjacent to said appliance control device and an oscillator operatively connected to said second antenna electrode for applying a second oscillating signal to said second antenna electrode, the oscillator being arranged adjacent to said appliance control device, and wherein said current detection circuit is configured to determine a second current flowing in said first antenna electrode in response to said second oscillating signal being applied to said second antenna electrode, said second current being indicative of whether an occupant of said vehicle seat has a part of their body moving toward or away from said appliance control device,
wherein said occupant detection system is configured to simultaneously detect whether an occupant is present on said vehicle seat and whether said occupant attempts to interact with said appliance control device with a comparison between the second current and a predetermined threshold.

2. The automotive vehicle according to claim 1, wherein said occupant detection system is configured to operate in a first mode of operation and in a second mode of operation, said first mode of operation being associated with detecting whether an occupant is present on said vehicle seat, said second mode of operation being associated with detecting whether said occupant attempts to interact with said appliance control device.

3. The automotive vehicle according to claim 2, wherein said occupant detection system operates only in said first mode of operation as long as no occupant is detected on said vehicle seat and wherein said occupant detection system alternately operates in said first and second modes of operation if an occupant is detected on said vehicle seat.

4. The automotive vehicle according to claim 1, wherein the oscillator operatively connected to said second antenna electrode is part of said oscillation circuit.

5. The automotive vehicle according to claim 2, wherein said oscillation circuit comprises a switch to alternatively connect said oscillator to said first antenna electrode or said second antenna electrode.

6. An automotive vehicle comprising
a vehicle seat,
an occupant detection system to detect whether an occupant is present on said vehicle seat, said occupant detection system including a first antenna electrode arranged in said seat and a sensing circuit associated with said seat, said sensing circuit comprising an oscillation circuit operatively connected to said first antenna electrode for applying to said first antenna electrode a first oscillating signal and a current detection circuit connected to said first antenna electrode for determining a first current flowing in said first antenna electrode in response to said first oscillating signal being applied, said first current being indicative of whether an occupant is present on said vehicle seat; and an appliance including an appliance control device;
wherein said occupant detection system includes a second antenna electrode proximate to an upper body of an occupant configured for being within reach of an occupant, said second antenna electrode being arranged immediately adjacent to said appliance control device and an oscillator operatively connected to said second antenna electrode for applying a second oscillating signal to said second antenna electrode, the oscillator being arranged adjacent to said appliance control device;
wherein said current detection circuit is configured to determine a second current flowing in said first antenna electrode in response to said second oscillating signal being applied to said second antenna electrode, said second current being indicative of whether an occupant of said vehicle seat has a part of their body moving toward or away from said
wherein said oscillation circuit comprises an oscillator connected with said first antenna electrode, wherein said first and second signals are of different frequencies, and wherein said current detection circuit comprises a first frequency-selective current meter sensitive at the frequency of said first signal and a second frequency-selective current meter sensitive at the frequency of said second signal,
wherein said occupant detection system is configured to simultaneously detect whether an occupant is present on said vehicle seat and whether said occupant attempts to interact with said appliance control device with a comparison between the second current and a predetermined threshold.

7. The automotive vehicle according to claim 6, wherein the oscillator operatively connected to said second antenna electrode is part of said oscillation circuit.

8. The automotive vehicle according to claim 7, wherein said oscillation circuit comprises a switch to alternatively connect said oscillator to said first antenna electrode or said second antenna electrode.

9. An automotive vehicle, comprising:
a vehicle seat;
an appliance including an appliance control device; and
an occupant detection system comprising a first antenna electrode arranged in the vehicle seat, an oscillation circuit configured to apply a first oscillating signal to the first antenna electrode, a second antenna electrode arranged adjacent to the appliance control device, an oscillator configured to apply a second oscillating signal to the second antenna electrode, and a current detection circuit configured to determine a first current flowing in the first antenna electrode in response to the first oscillating signal and to determine a second current flowing in the first antenna electrode in response to the second oscillating signal,
wherein the first current is indicative of whether an occupant is present on the vehicle seat and the second current is indicative of whether a body part of said occupant is moving toward or away from the appliance control device when said occupant is present on the vehicle seat,
wherein the second antenna electrode is spaced away from a floor of the vehicle and configured to be within reach of the body part of said occupant and within reach of a non-occupant of the vehicle seat when said occupant is present on the vehicle seat,
whereby, when the appliance control device is operated while said occupant is present on the vehicle seat, the occupant detection system functions to determine whether the appliance control device is being operated by said occupant or by said non-occupant.

10. The automotive vehicle according to claim 9, wherein the occupant detection system is configured to simultaneously detect whether said occupant is present on the vehicle seat and whether said occupant attempts to interact with the appliance control device with a comparison between the second current and a predetermined threshold.

11. The automotive vehicle according to claim 9, wherein the first and second oscillating signals are of different frequencies, and the current detection circuit comprises a first frequency-selective current meter sensitive at the frequency of the oscillating first signal and a second frequency-selective current meter sensitive at the frequency of the second signal.

* * * * *